Nov. 29, 1938. E. THYS 2,138,529
HOP SEPARATOR
Filed June 9, 1936 2 Sheets-Sheet 1

INVENTOR.
Edouard Thys.
BY
Chas. E. Townsend.
ATTORNEY.

Nov. 29, 1938.   E. THYS   2,138,529
HOP SEPARATOR
Filed June 9, 1936   2 Sheets-Sheet 2

INVENTOR.
Edouard Thys.
BY
Chas. E. Townsend.
ATTORNEY.

Patented Nov. 29, 1938

2,138,529

UNITED STATES PATENT OFFICE 2,138,529

HOP SEPARATOR

Edouard Thys, San Francisco, Calif.

Application June 9, 1936, Serial No. 84,309

4 Claims. (Cl. 209—45)

This invention relates to separators and especially to a machine for separating leaves and like foreign material from hops, the present application being a continuation in part of my copending application entitled "Hop picking machine," filed November 13, 1935, Serial Number 49,531.

The picking of hops by means of machinery is now a comparatively old art as machine picking has been in continuous use on a comparatively large scale in California and other States at least since 1910. The type of machine generally employed consists of a series of revolving drums from the surface of which project V-shaped flexible wire fingers. The vines to be picked are passed over and under the drums by a conveyor and as the vines pass over and under the drums they are combed by the V-shaped fingers and the hops are removed during the combing operation. A great many leaves and stems are also removed and some of the hops are broken, thereby forming petals, hence after the picking operation has been completed it becomes necessary to separate the hops from the leaves, petals and stems as the cleaner the hops the higher the market value of the same.

The present invention relates to a machine for separating the hops from the leaves, petals, stems, etc., the object being to improve and simplify the separation of hops of this character; to provide a pervious inclined belt upon which the hops, leaves, etc., are delivered; to provide means in the form of fans, or the like, placed under the belt so as to maintain a sufficient suction to cause the lighter material, such as leaves, petals, etc., to adhere to the surface of the belt while the inclination of the belt will permit the hops to roll down and off the belt; to arrange the belt in such a manner that the air blast produced by the discharge side of the fans may be utilized to release the leaves, petals, etc., from the belt; and, further, to provide means for adjusting the inclination of the belt to insure rolling and gravity separation of the hops from the leaves and other foregin matter.

The separator is shown by way of illustration in the accompanying drawings, in which—

Figure 1:
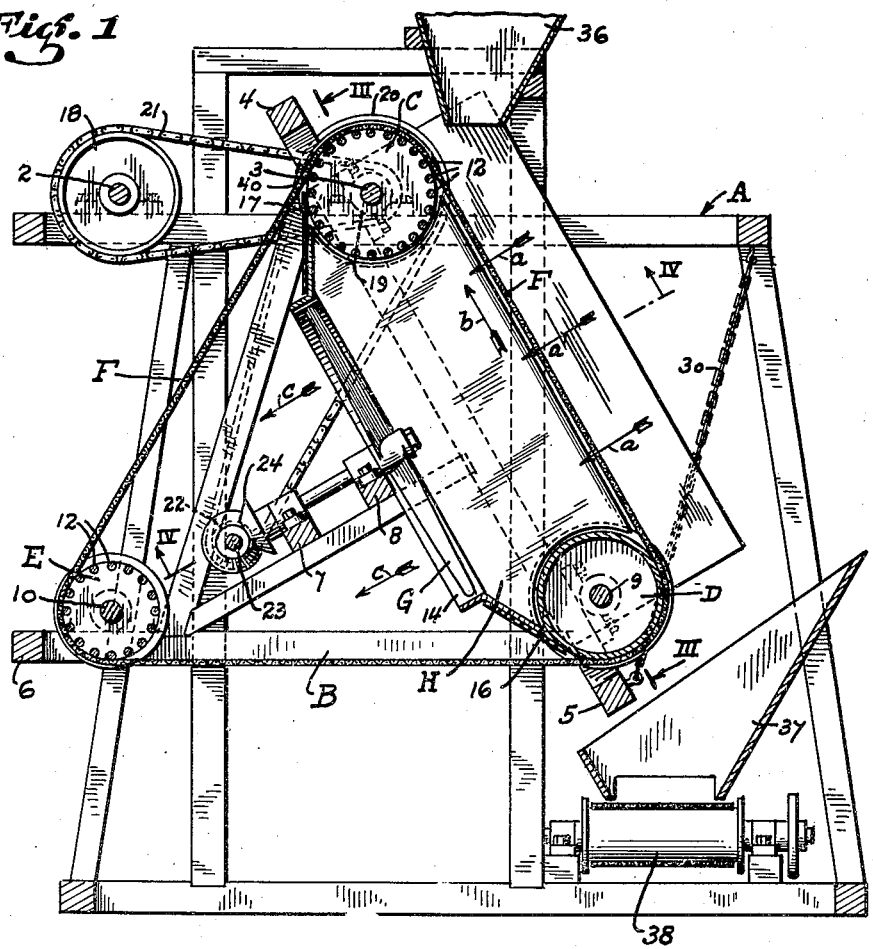
Fig. 1 is a central, vertical section of the separating machine.
Figure 2:
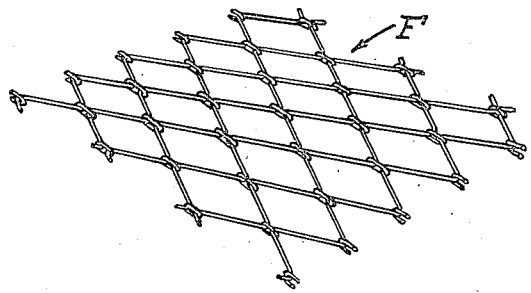
Fig. 2 is an enlarged perspective view of a portion of the separator belt.

Referring to the drawings in detail, and particularly Fig. 1, A indicates a main frame crosswise of which is journaled a drive shaft 2 and a driven shaft 3. Pivotally mounted on shaft 3 are a pair of triangular shaped frames B—B, one at each end thereof. These frames are tied together by cross bars 4, 5, 6, 7 and 8 to cause the frames to swing as a unit as will hereinafter be described.

Extending crosswise of the triangular frames B—B and journaled therein are cross shafts 9 and 10 and secured on the shafts 3, 9 and 10, between the end frames B—B, are drums generally indicated at C, D and E. The drums C and E are identical in construction. They consist of circular end plates or head members, one at each end of the respective shafts, between which are secured closely spaced rods or bars, such as indicated at 12. The drum D is an ordinary closed drum with a head at each end. This drum, together with the drums C and E, serves as a support for an endless separating belt F. This belt may be constructed of a coarse fabric, or a comparatively closely woven wire, or like material, but it must be sufficiently pervious to permit air to be freely drawn therethrough in the direction of arrow $a$ by means of a pair of axial flow fans, such as shown at G—G, or other suitable suction producing mechanism.

A housing H is secured between the triangular frames B—B on the underside of the drums C and D. This housing has two openings 14 and 15 formed therein, see Fig. 3, for the reception of the fans G—G. The housing otherwise forms a closure for the underside of the drums just referred to and the housing is also extended upwardly towards the separating belt F at each end to restrict the air flow, or in other words to cause it to pass through the separating belt only. The air also passes through the drum C, the bars 12 secured between the end plates of the drum being spaced apart such a distance that air will pass freely through the belt and between the rods and then downwardly into the housing to be discharged by the fans. The drums are so arranged as to divide the endless pervious belt into an upwardly traveling belt section, a downwardly traveling belt section and a bottom connecting belt section and the housing is located between the drums or pulleys of the upwardly traveling belt section and between the upwardly and downwardly traveling belt sections at the under side of the upwardly traveling belt section. The axial flow fans have their axis of rotation substantially at right angles to the plane of the upwardly traveling belt section and they are rotated so as to produce suction on the upwardly traveling belt section and discharge a blast of air against the downwardly traveling belt section.

The housing is made as leak-proof as possible so as to cause all of the air to pass through the belt and the drum C. Rubber flaps are provided as shown a 16 and 17 which are engageable with the surfaces of the respective drums to avoid air leaks as much as possible. The fans G—G, together with the drum C, which is the driver for the separating belt, are all driven from the drive shaft 2 as follows.

Figure 3:
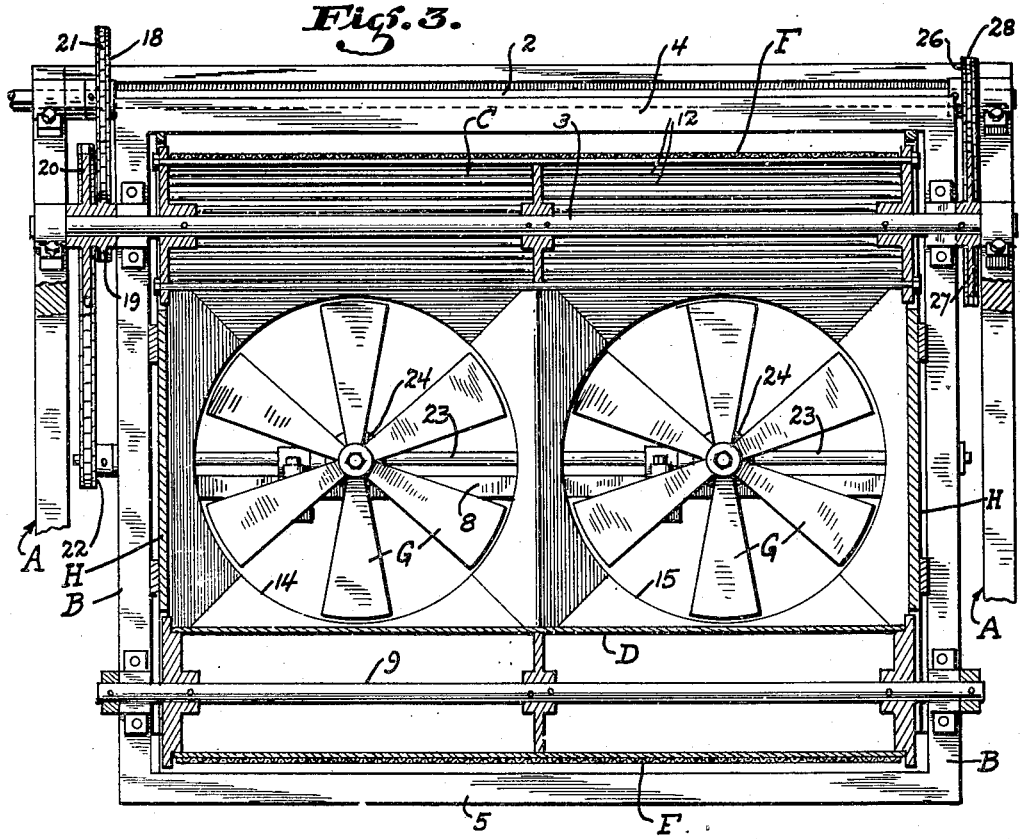
Fig. 3 is a cross section taken on line III—III of Fig. 1.
Figure 4:
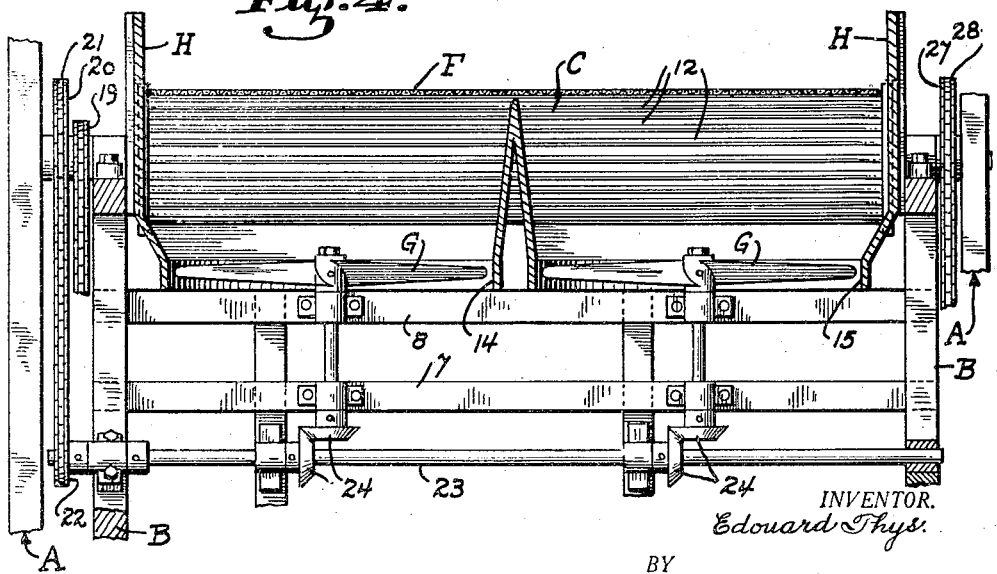
Fig. 4 is a cross section taken on line IV—IV of Fig. 1.

Secured on the drive shaft 2, see Fig. 3, is a sprocket gear 18. Freely rotatable on the shaft 3 are a pair of sprockets 19 and 20. A chain 21 passes over the sprockets 18 and 19 and a second chain passes from the sprocket 20 to a sprocket 22, which is secured on a cross shaft 23 journaled between the triangular end frames B—B. The drive just described is transmitted through bevel friction discs 24 to the shafts of the respective fans G—G and these are thus driven in unison and at high speed. On the opposite end of shaft 2 is mounted a sprocket gear 26 and secured on shaft 3 in alignment therewith is a sprocket gear 27, said gear being driven by a chain 28 from sprocket 26; thus one end of shaft 2 drives the drum C while the opposite end of the shaft through the sprocket end and the loosely mounted sprocket 20 drives the fan G—G.

The separating belt, as clearly shown in Fig. 1, assumes a rather steeply inclined position but this incline may be varied through means of one or more adjustable chains such as shown at 30. In actual operation with the separating belt traveling in the direction of arrow b, the hops mixed with the leaves, stems, petals, etc., will be delivered to the upper end of the belt by means of a hopper 36. The hops themselves are fairly round in shape and are heavy when compared with the leaves, stems, and petals. As these strike the surface of the separating belt they will roll and bounce by gravity and will finally discharge off the lower end of the belt into a hopper 37 which delivers them to a discharge conveyor 38. The suction produced by the fans G—G will at the same time cause the leaves, stems and petals to adhere to the surface of the belt and they will continue to adhere thereto until the belt leaves the upper drum C at the point indicated at 40. At this point the belt is relieved of the suction action and most of the separated material will fall by gravity to the rear of the machine where it may be removed in any suitable manner not here shown. Any material tending to adhere will, however, be blown off as there is a heavy blast of air discharging from the fans in the direction of arrows c—c. This blast of air does not only pass through the belt F but also the drum E, as this is also composed of spaced bars, hence any material tending to adhere will be blown off and the belt in clean condition will again pass over the drum D into the zone of suction so as to continue the separating action.

Plainly speaking, the hops due to their weight will separate and roll off the belt by gravity action, while the lighter material adheres thereto through the suction produced by the fans. This lighter material is, however, released by bringing the belt out of the zone of suction into the path of air blast discharging from the fans and is, accordingly, automatically cleaned and the operation of separating and cleaning is continuous, and while this and other features have been more or less specifically described and illustrated, I wish it understood that various changes may be resorted to within the scope of the appended claims. Similarly, that the materials and finish of the several parts employed may be such as the manufacturer may decide, or varying conditions or uses may demand.

Having thus described my invention, what I claim and desire to secure by Letters Patent is:

1. A mechanism for separating hops from leaves, stems and other foreign material comprising an endless pervious belt disposed at an inclination, a pulley at each end to support and drive the belt and to separate the belt into upwardly and downwardly traveling belt sections, means for depositing hops, leaves, etc., at the upper end of the upwardly traveling belt section, a fan housing disposed between the pulleys and between the upwardly and downwardly traveling belt sections at the under side of the upwardly traveling belt section and having an inlet substantially coextensive with the upwardly traveling belt section, and an axial flow fan in said housing having its axis of rotation substantially at right angles to the plane of the upwardly traveling belt section, and means for rotating the fan to produce suction on the upwardly traveling belt section to cause leaves and other foreign matter to adhere thereto and to discharge a blast of air directly against the downwardly traveling belt section to release the leaves and other foreign matter.

2. A mechanism for separating hops from leaves, stems and other foreign material, comprising an endless pervious belt disposed at an inclination, a pulley at each end to support and drive the belt and to separate the belt into upwardly and downwardly traveling belt sections, means for depositing hops, leaves, etc., at the upper end of the upwardly traveling belt section, a fan housing disposed between the pulleys and between the upwardly and downwardly traveling belt sections at the under side of the upwardly traveling belt section and having an inlet substantially coextensive with the upwardly traveling belt section, said fan housing partially enclosing the pulleys for causing all of the air entering the fan housing to pass through the upwardly traveling belt section, and an axial flow fan in said housing having its axis of rotation substantially at right angles to the plane of the upwardly traveling belt section, and means for rotating the fan to produce suction on the upwardly traveling belt section to cause leaves and other foreign matter to adhere thereto and to discharge a blast of air directly against the downwardly traveling belt section to release the leaves and other foreign matter.

3. A mechanism for separating hops from leaves and other foreign material comprising an endless pervious belt, an approximately triangular frame, a pulley at each angle of the frame to support and drive the belt and so arranged to separate the belt into upwardly and downwardly traveling belt sections and a bottom connection section, means for depositing hops, leaves, etc., at the upper end of the upwardly traveling belt section, a fan housing disposed between the pulleys of the upwardly traveling belt section and between the upwardly and downwardly traveling belt sections at the under side of the upwardly traveling belt section and having an inlet substantially coextensive with the upwardly traveling belt section, an axial flow fan in said housing having its axis of rotation substantially at right angles to the plane of the upwardly traveling belt section, and means for rotating the fan to produce suction on the upwardly traveling belt section to cause leaves, etc. to adhere thereto and discharge a blast of air directly upon the downwardly traveling belt section to release the leaves and other foreign matter.

4. A mechanism for separating hops from leaves and other foreign material comprising a main frame, a shaft journaled crosswise thereof, an approximately triangular frame pivotally hung at one of its angles from said shaft, an endless pervious belt, a pulley at each angle of the pivoted frame to support and drive the belt and so arranged as to separate the belt into upwardly and downwardly traveling belt sections and a bottom connecting section, one of said pulleys being pervious and mounted on said shaft and located at the upper end of the upwardly traveling belt section, a fan housing mounted on the pivoted frame and located between the pulleys of the upwardly traveling belt section and between the upwardly and downwardly traveling belt sections at the under side of the upwardly traveling belt section and having an air inlet substantially coextensive with the upwardly traveling belt section, an axial flow fan in said housing having its axis of rotation substantially at right angles to the plane of the upwardly traveling belt section, means for rotating the fan to produce suction on the upwardly traveling belt section to cause leaves and other foreign matter to adhere thereto and discharge a blast of air directly upon the downwardly traveling belt section to release the leaves and other foreign matter, and means for adjusting the pivoted frame to adjust the inclination of the belt, said fan housing and fan being carried by the pivoted frame in its adjustment and maintained in proper position with relation to the upwardly traveling belt section in each adjustment of the pivoted frame.

EDOUARD THYS.